(12) United States Patent
Furukawa

(10) Patent No.: US 7,567,672 B2
(45) Date of Patent: Jul. 28, 2009

(54) CRYPTOGRAPHIC COMMUNICATION SYSTEM

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 884 days.

(21) Appl. No.: 10/995,478

(22) Filed: Nov. 24, 2004

(65) Prior Publication Data

US 2005/0117751 A1 Jun. 2, 2005

(30) Foreign Application Priority Data

Nov. 27, 2003 (JP) ............................. 2003-397159

(51) Int. Cl.
*H04K 1/00* (2006.01)
(52) U.S. Cl. ..................... 380/255; 380/30; 380/44; 380/46; 380/47; 380/259; 380/277; 713/164; 713/168; 713/170; 713/176; 713/180
(58) Field of Classification Search .................. 380/30, 380/44, 46–47, 255, 259, 277; 713/164, 713/168, 170, 176, 180
See application file for complete search history.

(56) References Cited

U.S. PATENT DOCUMENTS 6,411,715 B1 * 6/2002 Liskov et al. ............... 380/277

7,003,541 B2 * 2/2006 Furukawa et al. ........... 708/512

OTHER PUBLICATIONS

D. Chaum, "Zero-Knowledge Undeniable Signatures, Advance in Cryptology, Proceedings of Eurocrypt '90 ", LNCS 473, Springer-Verlag, pp. 458-464, 1991.
M. Michels et al., "Efficient Convertible Undeniable Signature Schemes", Proceedings of 4th Annual Workshop on Selected Areas in Cryptography, SAC '97, Aug. 1997.

* cited by examiner

*Primary Examiner*—Kimyen Vu
*Assistant Examiner*—Baotran N To
(74) *Attorney, Agent, or Firm*—McGinn IP Law Group, PLLC

(57) ABSTRACT

In a cryptographic communication system, a prover is connected through a channel to a verifier. Elements a, b, c, d of a finite group are used as a public key and a parameter "x" as a private key, where "x" is a discrete logarithm of "b" to base "a". The prover calculates $e=a^{\alpha}b^{\beta}$, $g=c^{\alpha}d^{\beta}$ and $h=c^{\gamma}d^{\delta}$ (where $\alpha=\gamma+x(\delta-\beta)$ and $\beta$, $\gamma$ and $\delta$ are random values), and transmits e, g, h to the verifier, and shows that relations $a^{\alpha''}b^{\beta''}=e$, $c^{\alpha''}d^{\beta''}=g$, $a^{\gamma''}b^{\delta''}=e$, and $c^{\gamma''}d^{\delta''}=h$ are established without transmitting random values $\alpha''$, $b''$, $\gamma''$, $\delta''$. The verifier determines whether the prover is capable of establishing such relations using the public key and e, g and h. The prover is said to establish a proof that "x" is not equal to discrete logarithm of "d" to base "c" only if the verifier simultaneously determines that the relations are established and g is not equal to h.

22 Claims, 6 Drawing Sheets

CRYPTOGRAPHIC COMMUNICATION SYSTEM

BACKGROUND OF THE INVENTION

1. Field of the Invention

The present invention relates to a zero knowledge interactive protocol wherein the prover convinces the verifier of a statement without revealing it, using the mismatch between discrete logarithms employed in undeniable signatures which the prover cannot deny their validity if they were produced by the prover himself.

2. Description of the Related Art

Undeniable signatures are electronic signatures proposed by D. Chaum. This cryptographic technique employs a number system having a group G of order q of mod p (where p and q are prime numbers and the relation q|(p−1) holds, i.e., (p−1) is divisible by q. The signer uses $y=g^x$ (i.e., an element of the group G) and the primitive element g as a public key and uses x as a private key. A signature SIG on a message m is performed by the signer computing $SIG=m^x$. If it can be shown that, for a signature (m, SIG), the discrete log x' to the base m of $SIG=m^{x'}$ equals the discrete log x to the base g of a relation $y=g^x$, the signature is said to be verified. If $SIG' \neq m^x$ is shown for a signature (m, SIG'), it can be said that the signature is a fake. In general terms, the undeniable signature system requires that the prover must show equality/inequality between the discrete log of an input value y to the base g and the discrete log of an input value SIG to the base m and that the verifier must confirm this relation.

A prior art undeniable signature protocol is disclosed in the literature by D. Chaum "Zero-Knowledge Undeniable Signatures, Advance in Cryptology, Proceedings of Eurocrypt '90, LNCS 473, Springer-Verlag, pp. 458-464, 1991. As shown in FIG. 1, a typical example of a cryptographic communication system based on the zero-knowledge undesirable signature protocol is comprised of a prover 500 and a verifier 550, interconnected by a communications channel. Prover 500 is connected to a private key memory 501, a public key memory 502 and a random number generator 503. The element x of Z/qZ is stored in the private key memory 501. Prime numbers p and q of sufficiently large value having the relation q|(p−1), and elements g, m, z of a subgroup Gq of order q of (Z/pZ)* are stored in the public key memory 502 (note that $z \neq m^x$ mod p). Verifier 550 is associated with a public key memory 551 and a random number generator 552. In the public key memory 551 the verifier 550 shares the same public key information as that of the prover 500. Prover 500 establishes a proof that $z \neq m^x$ without revealing x to the verifier 550. Verifier 550 uses the random number generator 552 to generate a random value "x" smaller than "k" and a random value "a" as an element of Z/qZ, and computes $c[1]=m^s g^a$ mod p and $c[2]=z^s(g^x)^a$ mod p (block 553) and transmits a message 561 containing the results of the computations c[1] and c[2] to the prover 500. In response, the prover 500 makes a search through values 1 to k for detecting a value s' that satisfies the relation $c[1]^x/c[2]=(m^x/z)^{s'}$ mod p (block 504). As long as the verifier 550 behaves legitimately and the relation $z \neq m^x$ holds, this search results in the finding of a unique value s' which corresponds to a value the verifier 550 would find. Since the value s' found by the prover 500 satisfies the relation $z=m^x$ mod p, the probability that the verifier 550 selects the value s' is 1/k. Prover 500 uses the random number generator 503 to generate a random value "r" and uses it to generate a commitment of s' (block 505) and transmits commit (r, s') to the verifier 550. Verifier 550 responds to it by sending the random value "a" which was generated in the random number generator 55 (block 554). Using the transmitted random value, the prover 500 checks to see that if relations $c[1]=m^{s'}g^a$ mod p and $c[2]=z^{s'}(g^x)^a$ mod p are established (block 506). If the prover 500 confirms that these relations hold, it replies with the random value "r". In response to receipt of this random value, the verifier 550 determines whether s' coincides with s (block 555). If s'=s, the verifier 550 accepts the response as a valid proof; otherwise, it denies the response, thus completing a round of interactions (block 556). This round of interactions is repeated so that the probability of prover 500 cheating the verifier 550 is sufficiently reduced.

In the Chaum's zero-knowledge signature system, the prover is required to make a search for s' in the range of values 1 to k that satisfies the relation $c[1]^x/c[2]=(m^x/z)^{s'}$ mod p. Since this search involves a sequence of determinations each using a different value of s' on a trial-and-error basis, the system works at low efficiency. Furthermore, in each round of interactions, the verifier is required to generate a random value s and send it to the prover. Therefore, proof is impossible without sending messages from the verifier to the prover.

Another prior art undeniable signature is disclosed by M. Michels et al., in the literature "Efficient Convertible Undeniable Signature Schemes", Proceedings of $4^{th}$ Annual Workshop on Selected Areas in Cryptography, SAC '97, August 1997. This prior art protocol allows the prover to prove his own signature without assistance from the verifier. However, the prover is required to transmit the parameter $m^x$ to the verifier, indicating that "no signature is made on the secret message". Since the revealing of this information to the verifier implies that a signature has been unintentionally handed over to the verifier, the circumstance resulting from the transmission of $m^x$ contradicts its intended purpose.

SUMMARY OF THE INVENTION

It is therefore an object of the present invention to provide a cryptographic system capable of efficiently establishing a mismatch between discrete logarithms.

A further object of the present invention is to provide a cryptographic system, which allows the prover to establish a proof without assistance from the verifier, while revealing no secret information to the verifier.

According to a first aspect of the present invention, there is provided a cryptographic communication system comprising a store for storing a plurality of elements a, b, c, d of a finite group as a public key and a parameter "x" as a private key, wherein "x" is equal to discrete logarithm of "b" to base "a", and random values β, γ and δ are generated. The prover is connected through a communication channel to the verifier and accessible to the public key, the private key and the random values. The prover performs the functions of calculating $e=a^\alpha b^\beta$, $g=c^\alpha d^\beta$ and $h=c^\gamma d^\delta$, where $\alpha=\gamma+x(\delta-\beta)$, transmitting e, g and h to the channel, and showing to the communication channel that relations $a^{\alpha''}b^{\beta''}=e$, $c^{\alpha''}d^{\beta''}=g$, $a^{\gamma''}b^{\delta''}=e$, and $c^{\gamma''}d^{\delta''}=h$ are established without transmitting α", b", γ", δ" to the channel (where α", β", γ" and δ" are random values). The verifier is accessible only to the public key for receiving the transmitted e, g, h, and determining whether the prover is capable of establishing the relations by using the public key and the received e, g, h, and determining whether there is a mismatch between g and h, whereby the prover establishes a proof that the parameter x is not equal to discrete logarithm of "d" to base "c" only if the verifier determines that the relations are established and detects the mismatch.

In a preferred embodiment, the prover is configured to generate a set of random values and a set of commitment values using the set of random values, and transmit the commitment values to the verifier. The verifier is configured to generate a pair of random values in response to the commitment values from the prover, transmit the pair of random values to the prover for challenging the commitment values. In response, the prover generates a set of response values using the public key, the set of random values and the received challenging random values, and transmits the response values to the verifier. In response, the verifier determines whether the prover is capable of establishing the relations $a^{\alpha''}b^{\beta''}=e$, $c^{\alpha''}d^{\beta''}=g$, $a^{\gamma''}b^{\delta''}=e$, and $c^{\gamma''}d^{\delta''}=h$ based on the received response values and the received commitment values and the transmitted challenging values.

According to a second aspect, the present invention provides a method for identification of a prover to a verifier, comprising the steps of (a) storing a plurality of elements a, b, c, d of a finite group as a public key and a parameter "x" as a private key, wherein "x" is equal to discrete logarithm of "b" to base "a", wherein said prover is accessible to said public key and said private key and said verifier is only accessible to said public key, (b) generating random values $\beta$, $\gamma$ and $\delta$ by the prover, (c) calculating $e=a^{\alpha}b^{\beta}$, $g=c^{\alpha}d^{\beta}$ and $h=c^{\gamma}d^{\delta}$, where $\alpha=\gamma+x(\delta-\beta)$ by the prover, (d) transmitting e, g and h to the verifier, (e) showing to the verifier that relations $a^{\alpha''}b^{\beta''}=e$, $c^{\alpha''}d^{\beta''}=g$, $a^{\gamma''}b^{\delta''}=e$, and $c^{\gamma''}d^{\delta''}=h$ are established without transmitting $\alpha''$, $\beta''$, $\gamma''$, $\gamma''$ (where $\alpha''$, $\beta''$, $\gamma''$ and $\delta''$ are random values), (f) receiving the transmitted e, g, and h at the verifier, (g) determining by the verifier whether said prover is capable of establishing said relations by using the public key and the received e, g and h, and (h) determining by the verifier whether there is a mismatch between g and h, whereby the prover establishes a proof that the parameter x is not equal to discrete logarithm of "d" to base "c" only if the verifier determines that said relations are established and detects said mismatch.

BRIEF DESCRIPTION OF THE DRAWINGS

The present invention will be described in detail further with reference to the following drawings, in which.

DETAILED DESCRIPTION

In the following description, parameters p and q are prime numbers which establish the relation q|(p−1), i.e., (p−1) is divisible by the prime number q. Parameters a, b, c and d are the elements of a finite group of order q of mod p, and these parameters satisfy the relations $b=a^x \bmod p$ and $d \neq c^x \bmod p$.

Figure 1:
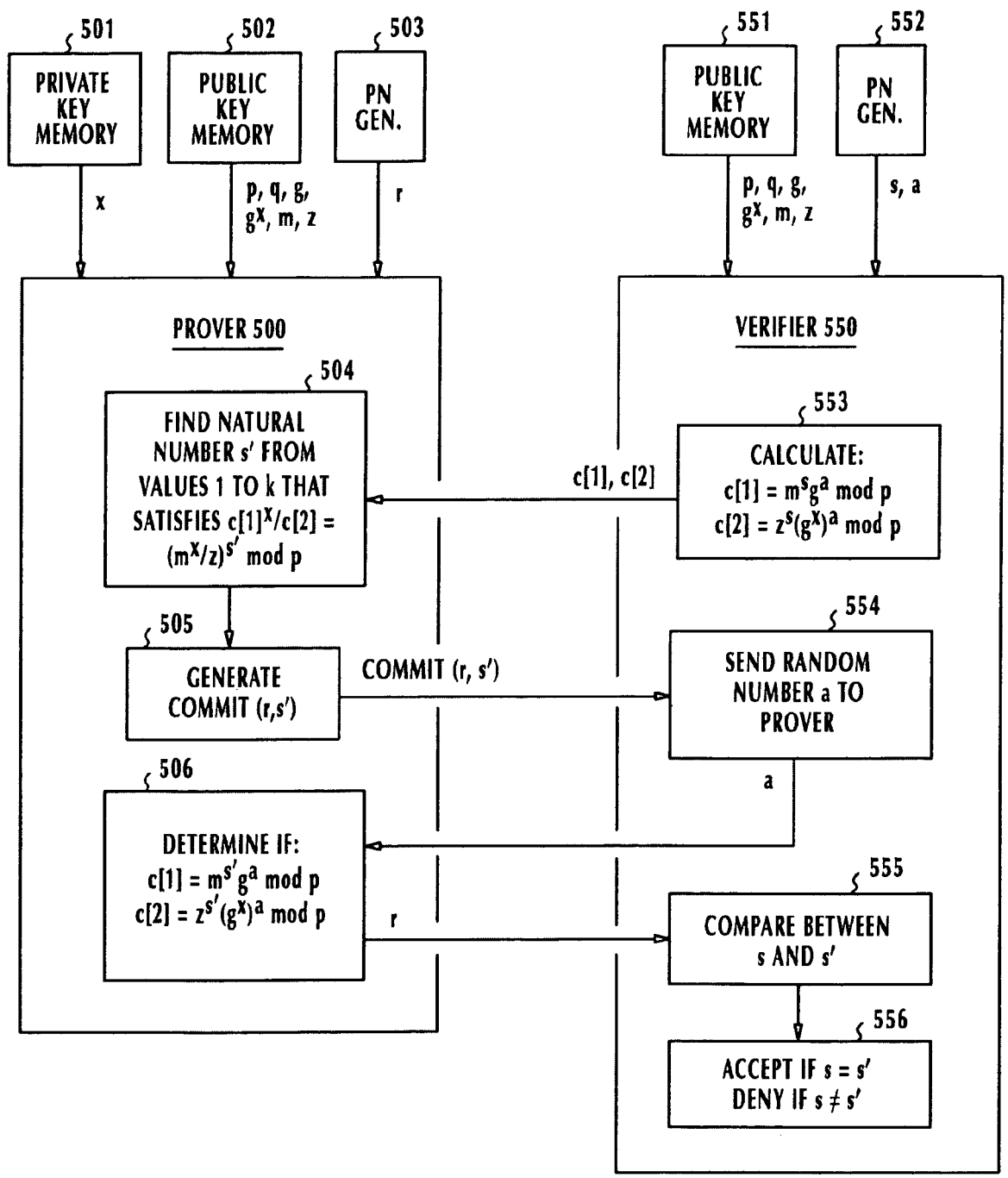
FIG. 1 is a block diagram of a prior art cryptographic communication system.
Figure 2:
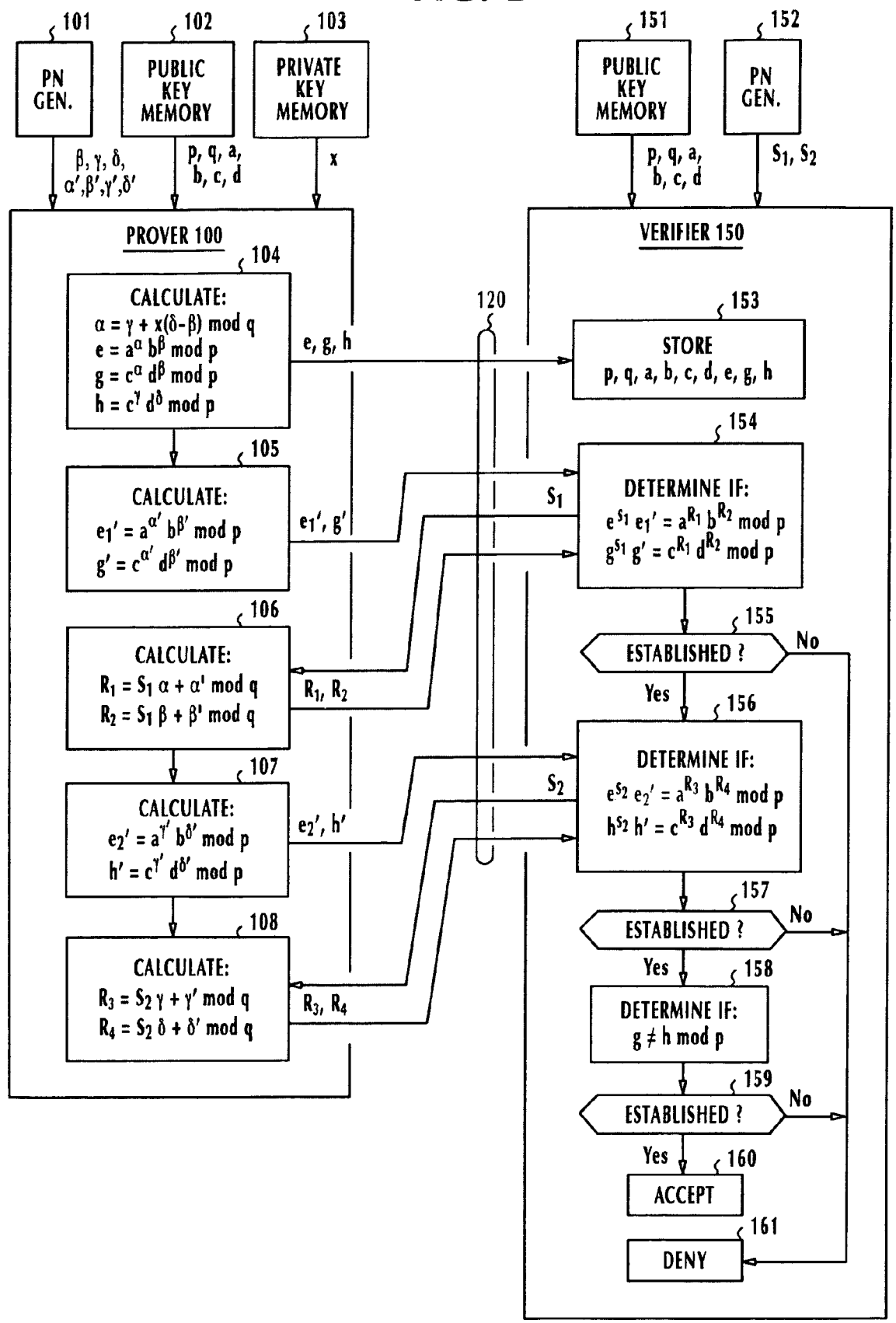
FIG. 2 is a block diagram of a cryptographic communication system according to a first embodiment of the present invention.

Referring now to FIG. 2, there is shown a cryptographic communication system according to a first embodiment of the present invention, in which the prover 100 is connected to the verifier 150 via a communication channel 120. As described below, the prover 100 establishes a proof that the discrete logarithm of "b" to base "a" is not equal to the discrete logarithm of "d" to base "c".

Prover 100 is connected to a pseudorandom number generator 101, a public key memory 102 and a private key memory 103, and the verifier 150 is connected to a public key memory 151.

The parameters p, q, a, b, c, d are stored in each of the public key memories 102 and 151. A private key "x" that satisfies the relation $b=a^x \bmod p$ is stored in the private key memory 103.

Prover 100 activates the pseudorandom number generator 101 to generate a set of random values $\beta$, $\gamma$ and $\delta \in Z/qZ$. In conversion process, the prover 100 reads public key parameters p, q, a, b, c, d from the public key memory 102 and private key parameter x from the private key memory 103 and performs the following calculations using the generated random values $\beta$, $\gamma$ and $\delta$ (block 104):

$$\alpha=\gamma+x(\delta-\beta) \bmod q \tag{1a}$$

$$e=a^{\alpha}b^{\beta} \bmod p \tag{1b}$$

$$g=c^{\alpha}d^{\beta} \bmod p \tag{1c}$$

$$h=c^{\gamma}d^{\delta} \bmod p \tag{1d}$$

Prover 100 transmits the calculated parameters e, g and h to the verifier 150 which receives the transmitted parameters e, g and h and stores them along with the public key parameters p, q, a, b, c, d (block 153).

A first round of interactions proceeds between the prover 100 and the verifier 150. In the first round of interactions, the prover 100 uses a first set of parameters p, q, a, b, c, d, e, g, $\alpha$, $\beta$, and the verifier 150 uses a second set of parameters p, q, a, b, c, d, e, g.

The prover and the verifier interact with each other so that the prover 100 establishes a proof that it can produce parameters $\alpha''$ and $\beta''$ of the following equations:

$$a^{\alpha''}b^{\beta''}=e \bmod p \tag{2a}$$

$$c^{\alpha''}d^{\beta''}=g \bmod p \tag{2b}$$

without transmitting these parameters from the prover 100 to the verifier 150 (where $\alpha''$ and $\beta''$ are random values).

This is done as follows. Initially, the prover 100 causes the PN generator to select random values $\alpha'$ and $\beta'$ from a finite group of random values of order q of mod p and calculates the following equations (block 105):

$$e_1'=a^{\alpha'}b^{\beta'} \bmod p \tag{3a}$$

$$g'=c^{\alpha'}d^{\beta'} \bmod p \tag{3b}$$

and then transmits $e_1'$ and g' to the verifier 150. In response, the verifier 150 randomly selects an integer $S_1$ in a range of values from 0 to q−1 and transmits the selected integer $S_1$ to the prover 100 and waits for a response (block 154). On receiving the random value $S_1$ (block 106), the prover 100 calculates response values $R_1$ and $S_1$ according to the following equations:

$$R_1=S_1\alpha+\alpha' \bmod q \tag{4a}$$

$$R_2=S_1\beta+\beta' \bmod q \tag{4b}$$

and sends $R_1$ and $R_2$ to the verifier 150.

In response to receipt of $R_1$ and $R_2$, the verifier 150 determines whether the following equations can be established (block 154):

$$e^{S_1}e_1'=a^{R_1}b^{R_2} \bmod p \qquad (5a)$$

$$g^{S_1}g'=c^{R_1}d^{R_2} \bmod p \qquad (5b)$$

If Equations (5a) and (5b) are established, the verifier 150 determines that the prover 100 is in possession of the knowledge of parameters α" and β" (block 155). Otherwise, it proceeds to deny the identification of the prover 100 (block 161).

In a similar manner, a second round of interactions proceeds between the prover 100 and the verifier 150. In this case, the prover 100 uses a third set of parameters p, q, a, b, c, d, e, h, γ, δ and the verifier 150 uses a fourth set of parameters p, q, a, b, c, d, e, h. They interact with each other so that the prover 100 proves that it can produce parameters γ" and δ" of Equations (6a) and (6b):

$$a^{\gamma"}b^{\delta"}=e \bmod p \qquad (6a)$$

$$c^{\gamma"}d^{\delta"}=h \bmod p \qquad (6b)$$

without revealing γ" and δ" to the verifier 150 (where γ and δ are random values). In this case, the prover 100 causes the PN generator to select random values γ' and δ' from a finite group of random values of order q of mod p and calculates the following equations (block 107):

$$e_2'=a^{\gamma'}b^{\delta'} \bmod p \qquad (7a)$$

$$h'=c^{\gamma'}d^{\delta'} \bmod p \qquad (7b)$$

and then transmits $e_2'$ and h' to the verifier 150. In response, the verifier 150 randomly selects an integer $S_2$ in a range of values from 0 to q−1 and transmits the selected integer $S_2$ to the prover 100 and waits for a response (block 156). Then, the prover 100 calculates response values $R_3$ and R4 according to the following equations, $$R_3=S_2\gamma+\gamma' \bmod q \qquad (8a)$$

$$R_4=S_2\delta+\delta' \bmod q \qquad (8b)$$

and sends $R_3$ and $R_4$ to the verifier 150 (block 108). In response, the verifier 150 determines whether the following equations can be established (block 156):

$$e^{S_2}e_2'=a^{R_3}b^{R_4} \bmod p \qquad (9a)$$

$$h^{S_2}h'=c^{R_3}d^{R_4} \bmod p \qquad (9b)$$

If Equations (9a) and (9b) are established, the verifier 150 determines that the prover 100 is in possession of the knowledge of parameters γ" and δ" (block 157) and proceeds to block 158 to determine whether the following relation holds:

$$g \neq h \bmod p \qquad (10)$$

If Equation (13) is established (block 159), Verifier 150 accepts the identification of the prover (block 160), verifying that the electronic signature provided by the prover 100 is authentic. Otherwise, the verifier 150 proceeds to block 161.

In order to verify the validity of the present invention, assume that the private key "x" should satisfy relations $b=a^x$ mod p and $d=c^x$ mod p, then the following relations will be established:

$$e=a^{\alpha}b^{\beta} \bmod p = a^{\alpha+\beta x} \bmod p$$

$$g=c^{\alpha}d^{\beta} \bmod p = c^{\alpha+\beta x} \bmod p$$

$$e=a^{\gamma}b^{\delta} \bmod p = a^{\gamma+\delta x} \bmod p$$

$$h=c^{\gamma}d^{\delta} \bmod p = c^{\gamma+\delta x} \bmod p$$

As a result, relations α+βx=γ+δx will be established. This indicates that the undesired relation g=h mod p holds. In addition, the present invention proves the presence of a mismatch between the discrete logarithm of b to base a and the discrete logarithm of d to base c by simultaneously showing the presence of a mismatch between g and h and the presence of α, β, γ and δ which satisfy $e=a^{\alpha}b^{\beta}$ mod p, $g=c^{\alpha}d^{\beta}$ mod p, $e=a^{\gamma}b^{\delta}$ mod p, and $h=c^{\gamma}d^{67}$ mod p.

Since the present invention eliminates the need to perform successive search for finding a predetermined value, the processing speed is much higher than the Chaum's prior art. Additionally, the present invention guarantees no possibility of the secret information being revealed to the verifier.

Figure 3:
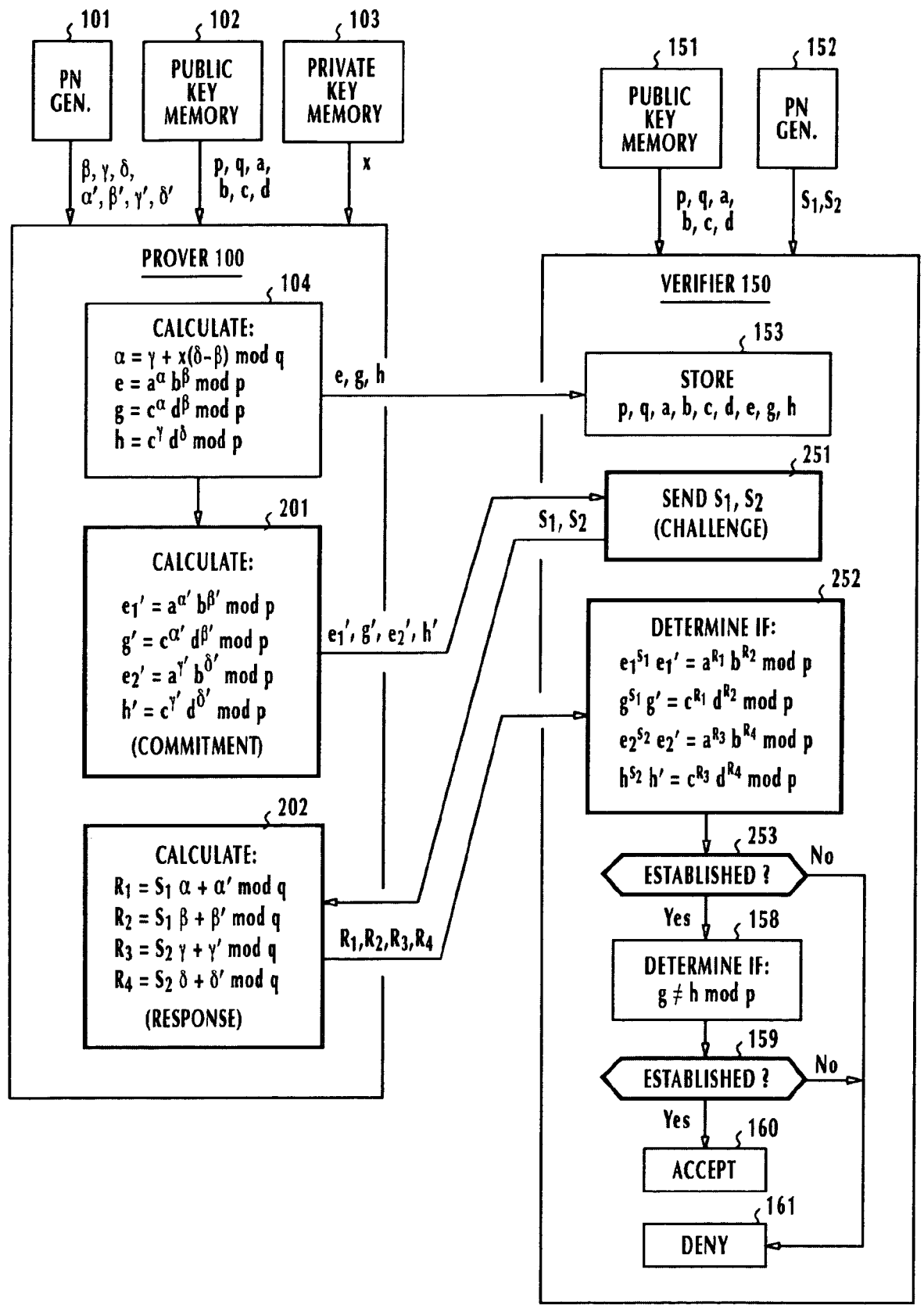
FIG. 3 is a block diagram of a first implementation of the first embodiment of the present invention.

FIG. 3 is a block diagram of a first practical implementation of the present invention in which parts corresponding to those of FIG. 2 are marked with the same numerals and the description thereof are omitted for simplicity.

Following block 104, the prover 100 proceeds to block 201 to generate random values α', β', γ', δ' and calculates the following equations:

$$e_1'=a^{\alpha'}b^{\beta'} \bmod p \qquad (11a)$$

$$g'=c^{\alpha'}d^{\beta'} \bmod p \qquad (11b)$$

$$e_2'=a^{\gamma'}b^{\delta'} \bmod p \qquad (11c)$$

$$h'=c^{\gamma'}d^{\delta'} \bmod p \qquad (11d)$$

and transmits $e_1'$, g', $e_2'$, h' as commitment values to the verifier 150.

In response to the commitment values, the verifier 150 activates a pseudorandom number generator 153 (block 251) to produce random values $S_1, S_2 \in$ field Z/qZ and transmits the random values as challenge values to the prover 100 and waits for a response.

Using the transmitted challenge values $S_1, S_2$, the prover 100 calculates response values $R_1$ to $R_4$ according to the following equations (block 202):

$$R_1=S_1\alpha+\alpha' \bmod q \qquad (12a)$$

$$R_2=S_1\beta+\beta' \bmod q \qquad (12b)$$

$$R_3=S_2\gamma+\gamma' \bmod q \qquad (12c)$$

$$R_4=S_2\delta+\delta' \bmod q \qquad (12d)$$

and sends $R_1, R_2, R_3, R_4$ to the verifier 150 as response values.

On receiving the response values from the prover 100, the verifier 150 determines whether the following equations can be established (block 252):

$$e^{S_1}e_1'=a^{R_1}b^{R_2} \bmod p \qquad (13a)$$

$$g^{S_1}g'=c^{R_1}d^{R_2} \bmod p \qquad (13b)$$

$$e^{S_1}e_2'=a^{R_3}b^{R_4} \bmod p \qquad (13c)$$

$$h^{S_2}h'=c^{R_3}d^{R_4} \bmod p \qquad (13d)$$

If the verifier determines that all Equations (13a), (13b), (13c) and (13d) are established (block 253), it proceeds to decision block 153 to detect for a mismatch between g and h. Otherwise, the verifier 150 proceeds to denial block 161.

Figure 4:
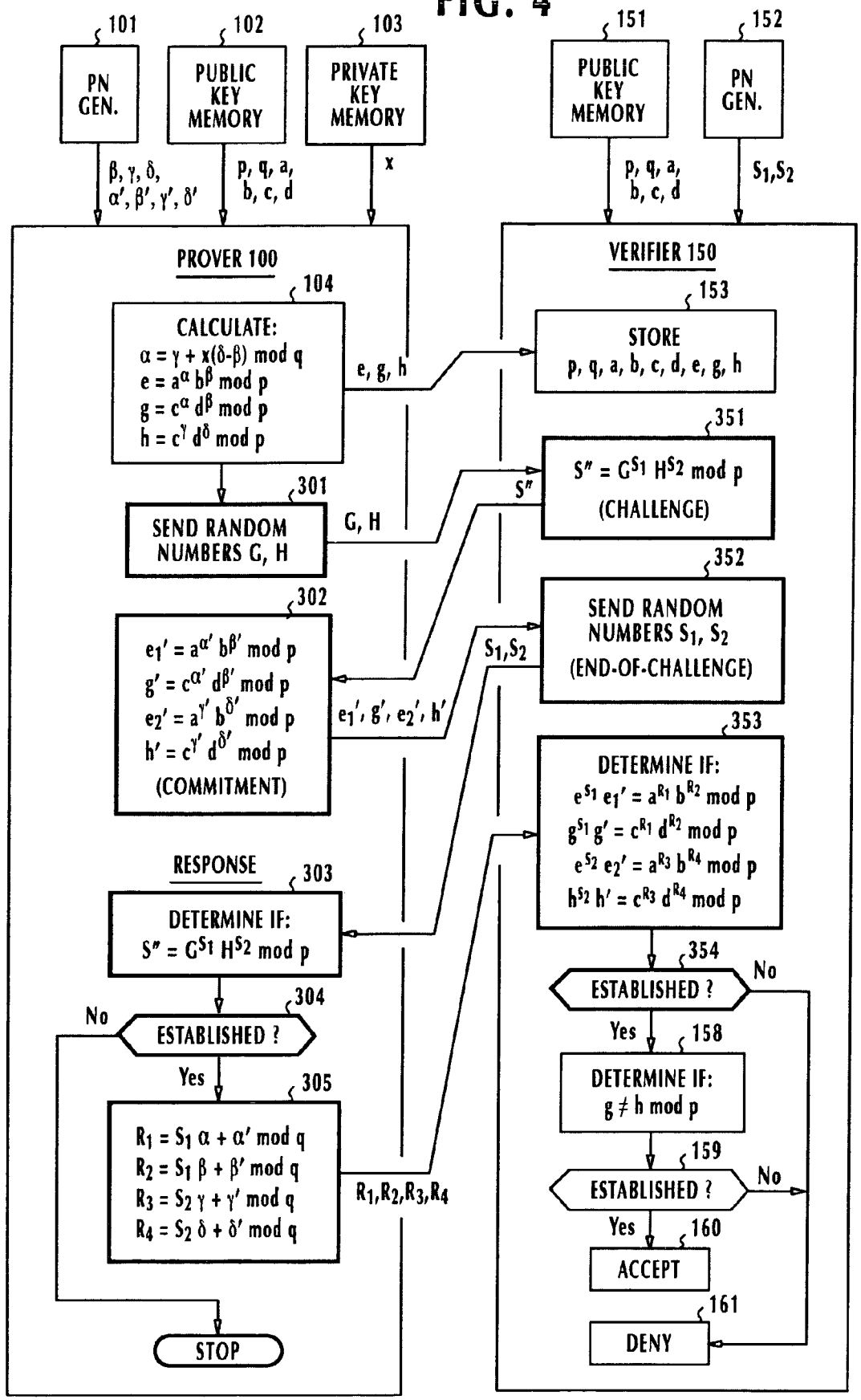
FIG. 4 is a block diagram of a second implementation of the first embodiment of the present invention.

FIG. 4 is a second practical implementation of the present invention.

Following block 104, the prover 100 proceeds to block 301 to generate random values G, H and transmits them to the verifier 150. Using the transmitted random values G and H, the verifier 150 generates random values $S_1$ and $S_2$ and calculates the following equation (block 351):

$$S''=G^{S_1}H^{S_2} \bmod p \tag{14}$$

and transmits the calculated value S" as a challenging value to the prover 100.

Prover 100 responds to the challenging value S" by activating the pseudorandom number generator 101 to generate random values $\alpha'$, $\beta'$, $\gamma'$, and $\delta'$ and calculates the following equations (block 302):

$$e_1'=a^{\alpha'}b^{\beta'} \bmod p \tag{15a}$$

$$g'=c^{\alpha'}d^{\beta'} \bmod p \tag{15b}$$

$$e_2'=a^{\gamma'}b^{\delta'} \bmod p \tag{15c}$$

$$h'=c^{\gamma'}d^{\delta'} \bmod p \tag{15c}$$

and transmits $e_1'$, $g'$, $e_2'$, $h'$ as commitment values to the verifier 150.

In response to the commitment values, the verifier 150 transmits the random values $S_1$ and $S_2$ to the prover 100 (block 352).

In block 302, the prover 100 determines if the relation $S''=G^{S_1}H^{S_2} \bmod p$ holds. If the decision in block 304 is negative, the prover 100 terminates its routine. If the decision is affirmative in block 304, the verifier 150 proceeds to block 305 to calculate the following equations:

$$R_1=S_1\alpha+\alpha' \bmod q \tag{16a}$$

$$R_2=S_1\beta+\beta' \bmod q \tag{16b}$$

$$R_3=S_2\gamma+\gamma' \bmod q \tag{16c}$$

$$R_4=S_2\delta+\delta' \bmod q \tag{16d}$$

and transmits the calculated values $R_1$ through $R_4$ as response values to the verifier 150.

Using the transmitted response values, the verifier 150 determines whether the following equations are established (blocks 353, 354):

$$e^{S_1}e_1'=a^{R_1}b^{R_2} \bmod p \tag{17a}$$

$$g^{S_1}g'=c^{R_1}d^{R_2} \bmod p \tag{17b}$$

$$e^{S_1}e_2'=a^{R_3}b^{R_4} \bmod p \tag{17c}$$

$$h^{S_2}h'=c^{R_3}d^{R_4} \bmod p \tag{17d}$$

If all of these equations are established, the decision in block 354 is affirmative and the verifier proceeds to block 158, otherwise to block 161.

Figure 5:
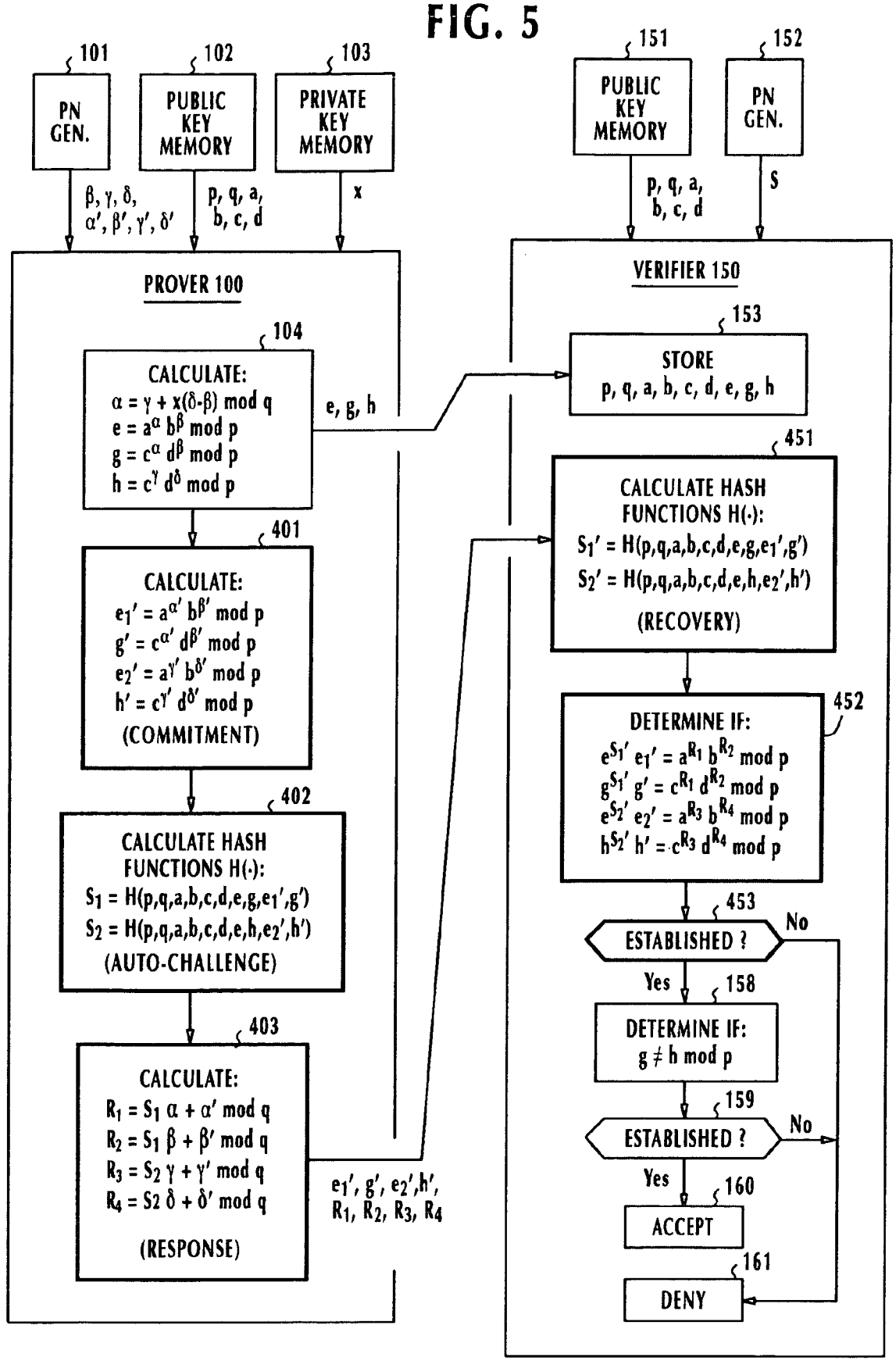
FIG. 5 is a block diagram of a third implementation of the first embodiment of the present invention.

FIG. 5 is a block diagram of a third practical implementation of the present invention.

Following block 104, the prover 100 proceeds to block 401 to generate random values $\alpha'$, $\beta'$, $\gamma'$ and $\delta'$ and calculates the following equations to generate commitment values $e_1'$, $g'$, $e_2'$ and $h'$:

$$e_1'=a^{\alpha'}b^{\beta'} \bmod p \tag{18a}$$

$$g'=c^{\alpha'}d^{\beta'} \bmod p \tag{18b}$$

$$e_2'=a^{\gamma'}b^{\delta'} \bmod p \tag{18c}$$

$$h'=c^{\gamma'}d^{\delta'} \bmod p \tag{18d}$$

In block 402, the prover 100 uses the public key a, b, c, d and the generated commitment values to calculate the following Hash functions to produce auto-challenge values $S_1$ and $S_2$:

$$S_1=H(p, q, a, b, c, d, e, g, e, g, e_1', g') \tag{19a}$$

$$S_2=H(p, q, a, b, c, d, e, g, e, h, e_2', h') \tag{19b}$$

In block 403, the prover 100 calculates the following equations using the auto-challenge values $S_1$ and $S_2$ to produce response values $R_1$, $R_2$, $R_3$ and $R_4$:

$$R_1=S_1\alpha+\alpha' \bmod q \tag{20a}$$

$$R_2=S_1\beta+\beta' \bmod q \tag{20b}$$

$$R_3=S_2\gamma+\gamma' \bmod q \tag{20c}$$

$$R_4=S_2\delta+\delta' \bmod q \tag{20d}$$

and transmits the commitment values and the response values to the verifier 150.

Using the transmitted commitment values and the response values, and the public key a, b, c, d, the verifier 150 calculates the following Hash functions to generate challenge-recovery values $S_1'$ and $S_2'$ (block 451):

$$S_1'=H(p, q, a, b, c, d, e, g, e, g, e_1', g') \tag{21a}$$

$$S_2'=H(p, q, a, b, c, d, e, g, e, h, e_2', h') \tag{21b}$$

In block 452, the verifier 150 determines whether the following relations are established:

$$e^{S_1}e_1'=a^{R_1}b^{R_2} \bmod p \tag{22a}$$

$$g^{S_1}g'=c^{R_1}d^{R_2} \bmod p \tag{22b}$$

$$e^{S_1}e_2'=a^{R_3}b^{R_4} \bmod p \tag{22c}$$

$$h^{S_2}h'=c^{R_3}d^{R_4} \bmod p \tag{22d}$$

If these relations are established (in block 453), the verifier 150 proceeds to decision block 158, otherwise to block 161. Since this implementation eliminates communication from the verifier to the prover, the processing speed is higher than those described above.

Figure 6:
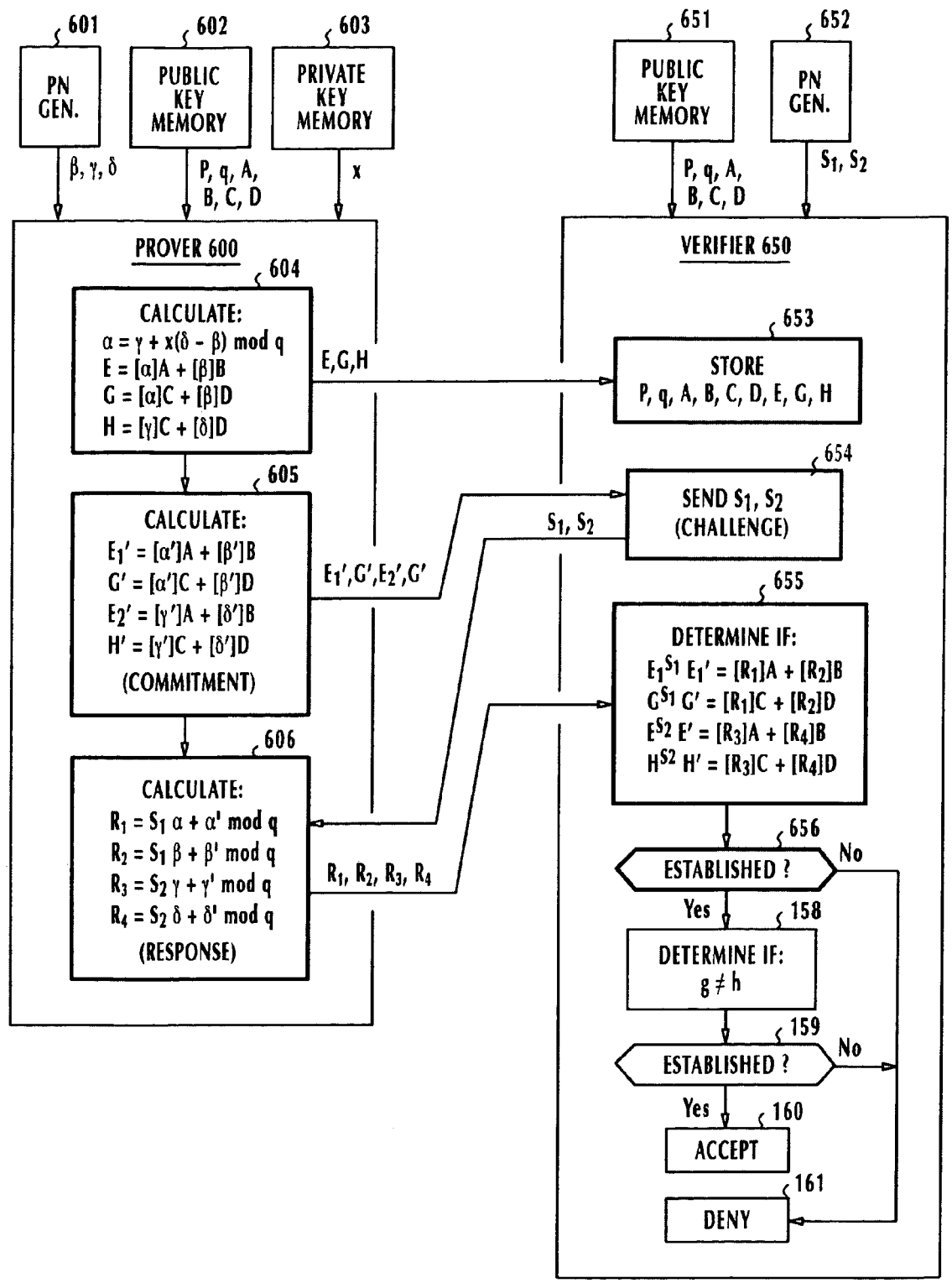
FIG. 6 is a block diagram of a cryptographic communication system according to a second embodiment of the present invention.

The present invention can be implemented in a manner as shown in FIG. 6. In this implementation, a parameter P represents an elliptic curve of order q and parameters A, B, C and D are elements of the elliptic curve P, where the relations $B=[x]A$ and $D\neq[x]B$ are satisfied. Note that $[x]A$ represents a multiple x of point A on the elliptic curve P.

Both of the prover 600 and the verifier 650 share the public key represented by P, q, A, B, C and D in their respective memories 602 and 651. Private key "x" is stored in the private key memory 603 of the prover. Prover uses a PN generator 601 to generate random values $\beta$, $\gamma$ and $\delta$, and the verifier 150 uses a PN generator 652 to generate random values $S_1$ and $S_2$.

In block 604, the prover 600 calculates the following equations to generate parameters E, G and H:

$$\alpha=\gamma+x(\delta-\beta) \bmod q \tag{23a}$$

$$E=[\alpha]A[\beta]B \tag{23b}$$

$$G=[\alpha]C[\beta]D \tag{23c}$$

$$H=[\gamma]C[\delta]D \tag{23d}$$

and transmits the parameters E, G and H to the verifier 650 (block 604).

Verifier 650 receives the transmitted parameters and store P, A, B, C, D, E, G and H in memory (block 653).

Following block 604, the prover 600 and the verifier 650 interact with each other to establish the following relations:

$$[\alpha'']A+[\beta'']B=E \quad (24a)$$

$$[\alpha'']C+[\beta'']D=G \quad (24b)$$

$$[\gamma'']A+[\gamma'']B=E \quad (24c)$$

$$[\gamma'']C+[\gamma\Delta]D=H \quad (24d)$$

This is achieved as follows:

Prover 600 first calculates the following equations to produce commitment values $E_1'$, $G'$, $E_2'$ and $H'$:

$$E_1'=[\alpha']A[\beta']B \quad (25a)$$

$$G'=[\alpha']C[\beta']D \quad (25b)$$

$$E_2'=[\gamma']A[\beta']B \quad (25c)$$

$$H'=[\gamma']C[\delta']D \quad (25d)$$

and transmits the commitment values to the verifier 650 (block 605).

On receiving the commitment values, the verifier 650 generates random values $S_1$ and $S_2$ as challenging values and sends them to the prover 600 (block 654).

Prover 600 then calculates the following equations to produce response values $R_1 \sim R_4$:

$$R_1 = S_1\alpha + \alpha' \bmod q \quad (26a)$$

$$R_2 = S_1\beta + \beta' \bmod q \quad (26b)$$

$$R_3 = S_2\gamma + \gamma' \bmod q \quad (26c)$$

$$R_4 = S_2\delta + \delta' \bmod q \quad (26d)$$

and transmits the response values to the verifier 650 (block 606).

In response, the verifier 650 calculates the following equations (block 655) and determines if they are established (block 656):

$$[S_1]EE_1' = [R_1]A + [R_2]B \quad (27a)$$

$$[S_1]GG' = [R_1]C + [R_2]D \quad (27b)$$

$$[S_2]EE_2' = [R_3]A + [R_4]B \quad (27c)$$

$$[S_2]HH' = [R_3]C + [R_4]D \quad (27d)$$

If the decision in block 656 is affirmative, the verifier 650 determines whether the following relation holds (block 657):

$$G \ne H \bmod P \quad (28)$$

If this relation holds (block 658), the verifier identifies the prover as authentic (block 1600). If the decision in block 656 or 658 is negative, the verifier denies the authenticity of the prover (block 161).

What is claimed is:

1. A cryptographic communication system comprising:
   a store that stores a plurality of elements a, b, c, d of a finite group as a public key and a parameter "x" as a private key, wherein "x" is equal to a discrete logarithm of "b" to base "a";
   means for generating random values $\beta$, $\gamma$ and $\delta$;
   a prover connected to a communication channel and accessible to said public key, said private key, and said random values, for calculating $e=a^\alpha b^\beta$, $g=c^\alpha d^\beta$ and $h=c^\gamma d^\delta$, where $\alpha=\gamma+x(\delta-\beta)$, transmitting e, g and h to said channel, and showing to the communication channel that relations $a^{\alpha''}b^{\beta''}=e$, $c^{\alpha''}d^\beta=g$, $a^{\gamma''}b^{\delta''}=e$, $c^{\gamma''}d^{\delta''}=h$ are established without transmitting $\alpha''$, $\beta''$, $\gamma''$, $\delta''$ to said channel (where $\alpha''$, $\beta''$, $\gamma''$ and $\delta''$ are random values); and
   a verifier, connected through said channel to said prover, for receiving the transmitted e, g and h, and determining whether said prover is capable of establishing said relations by using the public key and the received e, g, h, and determining whether there is a mismatch between g and h,
   whereby said prover establishes a proof that the parameter x is not equal to discrete logarithm of "d" to base "c" only if said verifier determines that said relations are established and detects said mismatch.

2. The cryptographic communication system of claim 1, wherein said prover is configured to:
   generate a set of random values,
   generate a set of commitment values using the set of random values, and
   transmit the commitment values to said verifier,
   wherein said verifier is configured to:
   generate a pair of random values in response to the commitment values from said prover, and
   transmit said pair of random values to the prover for challenging the commitment values,
   wherein said prover is configured to:
   receive the challenging random values,
   generate a set of response values using said public key, said set of random values and the received challenging random values, and
   transmit the response values to the verifier,
   wherein said verifier is configured to:
   receive the transmitted response values, and
   determine whether said prover is capable of establishing said relations based on the received response values, said received commitment values and said transmitted challenging values.

3. The cryptographic communication system of claim 1, wherein said prover is configured to:
   generate random values $\alpha''$, $\beta''$, $\gamma''$ and $\delta''$,
   calculate commitment values $e_1'=a^{\alpha'}b^{\beta'}$, $g'=c^{\alpha'}d^{\beta'}$, $e_2'=a^{\gamma'}b^{\delta'}$, $h'=c^{\gamma'}d^{\delta'}$, and
   transmit the commitment values $e_1'$, $g'$, $e_2'$ and $h'$ to the verifier;
   wherein said verifier is configured to:
   generate random values $S_1$ and $S_2$ in response to receipt of said commitment values, and
   transmit the random value $S_1$ to the prover for challenging the commitment values $e_1'$ and $g'$ and transmit the random $S_2$ to the prover for challenging the commitment values $e_2'$ and $h'$,
   wherein said prover is configured to:
   calculate response values $R_1=S_1\alpha+\alpha'$, $R_2=S_1\beta+\beta'$, $R_3=S_2\gamma+\gamma'$, and $R_4=S_2\beta+\beta'$, and
   transmit the response values $R_1$, $R_2$, $R_3$ and $R_4$ to the verifier,
   wherein said verifier is configured to:
   calculate $e_1^{S_1}e_1'=a^{R_1}b^{R_2}$, $g^{S_1}g_1'=c^{R_1}d^{R_2}$, $e_2^{S_2}e_2'=a^{R_3}b^{R_4}$, and $h^{S_2}h'=c^{R_3}d^{R_4}$ to produce said relations, and
   determine whether all of said relations are established.

4. The cryptographic communication system of claim 1, wherein said prover is configured to:
   generate a pair of random values, and
   transmit the random values as reference values to the verifier, wherein the verifier is configured to:
  receive the transmitted reference values,
  generate a challenging value by using the received reference values, and
  transmit the challenging value to the prover,
wherein said prover is configured to:
  generate a set of random values in response to the transmitted challenging value,
  generate a set of commitment values by using the set of generated random values and the challenging value received from said verifier, and
  transmit the commitment values to the verifier,
wherein said verifier is configured to:
  receive the commitment values,
  generate a pair of random values, and
  transmit the pair of random values to the prover,
wherein said prover is configured to:
  receive the transmitted random values, and
  determine whether the received random values and said transmitted pair random values are calculated to be equal to said challenging value, if the calculated random values are equal to said challenging value, generate a set of response values by using the public key, the pair of received random values and said set of random values, and
  transmit the set of response values to the verifier, and
wherein said verifier is configured to:
  determine whether said prover is capable of establishing said relations based on the received response values, said received commitment values and said pair of random values transmitted from the verifier.

5. The cryptographic communication system of claim 1, wherein said prover is configured to:
  generate a pair of random values G and H, and
  transmit the random values G and H as reference values to the verifier,
wherein the verifier is configured to:
  receive the transmitted reference values G and H,
  generate a pair of random values $S_1$ and $S_2$,
  generate a challenging value S" by using the received reference values G and H and the random values $S_1$ and $S_2$, and
  transmit the challenging value S" to the prover,
wherein said prover is configured to:
  generate a set of random values $\alpha'$, $\beta'$, $\gamma'$ and $\delta'$ in response to receipt of the transmitted challenging value S",
  calculate a set of commitment values $e_1'=a^{\alpha'}b^{\beta'}$, $g'=c^{\alpha'}d^{\beta'}$, $e_2'=a^{\gamma'}b^{\delta'}$, and $h'=c^{\gamma'}d^{\delta'}$, and
  transmit the commitment values $e_1'$, $g'$, $e_2'$, $h'$ to the verifier,
wherein said verifier is configured to transmit said pair of random values $S_1$ and $S_2$ to the prover in response to receipt of the commitment values,
wherein said prover is configured to:
  receive the transmitted random values $S_1$ and $S_2$,
  determine whether a relation $S''=G^{S_1}H^{S_2}$ is established,
  if said relation is established, generate a set of response values $R_1=S_1\alpha+\alpha'$, $R_2=S_1\beta+\beta'$, $R_3=S_2\gamma+\gamma'$, and $R_4=S_2\delta+\delta'$, and
  transmit the response values $R_1$, $R_2$, $R_3$, $R_4$ to the verifier,
wherein said verifier is configured to:
  calculate $e_1^{S_1}e_1'=a^{R_1}b^{R_2}$, $g^{S_1}g_1'=c^{R_1}d^{R_2}$, $e_2^{S_2}e_2'=a^{R_3}b^{R_4}$, and $h^{S_2}h'=c^{R_3}d^{R_4}$ to produce said relations, and
  determine whether all of said relations are established.

6. The cryptographic communication system of claim 1, wherein said prover is configured to:
  generate a set of random values,
  generate a set of commitment values using said set of random values,
  calculate a pair of Hash values of said public key and said commitment values to produce auto-challenging values,
  calculate a set of response values by using the auto-challenging values, the public key and said set of random values, and
  transmit the set of commitment values and the set of response values to the verifier,
wherein said verifier is configured to:
  receive the set of commitment values and the set of response values,
  calculate a pair of Hash values of said public key and the received commitment values, and
  determine whether said prover is capable of establishing said relations based on the public key, the calculated Hash values, the received response values, and said received commitment values.

7. The cryptographic communication system of claim 1, wherein said prover is configured to:
  generate a set of random values $\alpha'$, $\beta'$, $\gamma'$ and $\delta'$,
  calculate a set of commitment values $e_1'=a^{\alpha'}b^{\beta'}$, $g'=c^{\alpha'}d^{\beta'}$, $e_2'=a^{\gamma'}b^{\delta'}$, and $h'=c^{\gamma'}d^{\delta'}$,
  calculate an auto-challenging value $S_1=H(a, b, c, d, e, g, e_1', g')$ and an auto-challenging value $S_2=H(a, b, c, d, e, h, e_2', h')$,
  calculate a set of response values $R_1=S_1\alpha+\alpha'$, $R_2=S_1\beta+\beta'$, $R_3=S_2\gamma+\gamma'$, and $R_4=S_2\beta+\beta'$, and
  transmit the set of commitment values and the set of response values to the verifier,
wherein said verifier is configured to:
  receive the set of commitment values and the set of response values,
  calculate $S_1'=H(a, b, c, d, e, g, e_1', g')$ and $S_2'=H(a, b, c, d, e, h, e_2', h')$,
  calculate $e_1^{S_1}e_1'=a^{R_1}b^{R_2}$, $g^{S_1}g_1'=c^{R_1}d^{R_2}$, $e_2^{S_2}e_2'=a^{R_3}b^{R_4}$, and $h^{S_2}h'=c^{R_3}d^{R_4}$ to produce said relations, and
  determine whether all of said relations are established.

8. A method for identification of a prover to a verifier, comprising:
  storing a plurality of elements a, b, c, d of a finite group as a public key and a parameter "x" as a private key, wherein "x" is equal to discrete logarithm of "b" to base "a", wherein said prover is accessible to said public key and said private key and said verifier is only accessible to said public key;
  generating random values $\beta$, $\gamma$ and $\delta$ by the prover;
  calculating $e=a^{\alpha}b^{\beta}$, $g=c^{\alpha}d^{\beta}$ and $h=c^{\gamma}d^{\delta}$, where $\alpha=\gamma+x(\delta-\beta)$ by said prover;
  transmitting e, g and h to said verifier;
  showing to said verifier that relations $a^{\alpha''}b^{\beta''}=e$, $c^{\alpha''}d^{\beta''}=g$, $a^{\gamma''}b^{\delta''}=e$, $c^{\gamma''}d^{\delta''}=h$ are established without transmitting $\alpha''$, $\beta''$, $\gamma''$, $\delta''$ (where $\alpha''$, $\beta''$, $\gamma''$ and $\delta''$ are random values);
  receiving the transmitted e, g, and h at said verifier;
  determining by said verifier whether said prover is capable of establishing said relations by using the public key and the received e, g and h; and
  determining by said verifier whether there is a mismatch between g and h, whereby said prover establishes a proof that the parameter x is not equal to discrete logarithm of "d" to base "c" only if said verifier determines that said relations are established and detects said mismatch.

9. The method of claim 8, wherein the showing, receiving, and determining by said verifier whether said prover is capable of establishing said relations by using the public key and the received e, g and h each comprises:
- generating, at said prover, a set of random values;
- generating a set of commitment values using the set of random values;
- transmitting the commitment values from said prover to said verifier;
- generating a pair of random values, at said verifier, in response to the commitment values from said prover;
- transmitting said pair of random values from said verifier to the prover for challenging the commitment values;
- receiving the challenging random values at said prover;
- generating a set of response values, at said prover, using said public key, said set of random values and the received challenging random values;
- transmitting the response values from the prover to the verifier;
- receiving the transmitted response values at said verifier; and
- determining by said verifier whether said prover is capable of establishing said relations based on the received response values, said received commitment values and said transmitted challenging values.

10. The method of claim 8, wherein the showing, receiving, and determining by said verifier whether said prover is capable of establishing said relations by using the public key and the received e, g and h each comprises:
- generating random values $\alpha'$, $\beta'$, $\gamma'$ and $\delta'$ at said prover;
- calculating commitment values $e_1'=a^{\alpha'}b^{\beta'}$, $g'=c^{\alpha'}d^{\beta'}$, $e_2'=a^{\gamma'}b^{\delta'}$, $h'=c^{\gamma'}d^{\delta'}$, at said prover;
- transmitting the commitment values $e_1'$, $g'$, $e_2'$ and $h'$ from the prover to the verifier;
- generating random values $S_1$ and $S_2$ by the verifier in response to receipt of said commitment values;
- transmitting from the verifier to the prover the random value $S_1$ for challenging the commitment values $e_1'$ and $g'$ and the random $S_2$ for challenging the commitment values $e_2'$ and $h'$;
- calculating, at said prover, response values $R_1=S_1\alpha+\alpha'$, $R_2=S_1\beta+\beta'$, $R_3=S_2\gamma+\gamma'$, and $R_4=S_2\beta+\beta'$;
- transmitting, from the prover, the response values $R_1$, $R_2$, $R_3$ and $R_4$ to the verifier;
- calculating, at said verifier, $e_1^{S_1}e_1'=a^{R_1}b^{R_2}$, $g^{S_1}g_1'=c^{R_1}d^{R_2}$, $e_2^{S_2}e_2'=a^{R_3}b^{R_4}$, and $h^{S_2}h'=c^{R_3}d^{R_4}$ to produce said relations;
- determining, at said verifier, whether all of said relations are established.

11. The method of claim 8, wherein the showing, receiving, and determining by said verifier whether said prover is capable of establishing said relations by using the public key and the received e, g and h each comprises:
- generating, at said prover, a pair of random values;
- transmitting, from the prover, the random values as reference values to the verifier;
- receiving, at the verifier, the transmitted reference values;
- generating, at the verifier, a challenging value by using the received reference values;
- transmitting, from the verifier, the challenging value to the prover,
- generating, at said prover, a set of random values in response to the transmitted challenging value,
- generating, at the prover, a set of commitment values by using the set of generated random values and the challenging value received from said verifier;
- transmitting, from the prover, the commitment values to the verifier;
- receiving, at the verifier, the commitment values;
- generating a pair of random values; and
- transmitting the pair of random values from the verifier to the prover;
- receiving, at the prover, the transmitted random values;
- determining by the prover, whether the received random values and said transmitted pair random values are calculated to be equal to said challenging value;
- if the calculated random values are equal to said challenging value, generating, at the prover, a set of response values by using the public key, the pair of received random values and said set of random values;
- transmitting, from the prover, the set of response values to the verifier; and
- determining whether said prover is capable of establishing said relations based on the received response values, said received commitment values and said pair of random values transmitted from the verifier.

12. The method of claim 8, wherein the showing, receiving, and determining by said verifier whether said prover is capable of establishing said relations by using the public key and the received e, g and h each comprise:
- generating, at said prover, a pair of random values G and H;
- transmitting the random values G and H as reference values to the verifier;
- receiving, at the verifier, the transmitted reference values G and H;
- generating, at the verifier, a pair of random values $S_1$ and $S_2$;
- generating, at the verifier, a challenging value S" by using the received reference values G, H and the random values $S_1$ and $S_2$;
- transmitting, from the verifier, the challenging value S" to the prover;
- generating, at the prover, a set of random values $\alpha'$, $\beta'$, $\gamma'$ and $\delta'$ in response to receipt of the transmitted challenging value S";
- calculating a set of commitment values $e_1'=a^{\alpha'}b^{\beta'}$, $g'=c^{\alpha'}d^{\beta'}$, $e_2'=a^{\gamma'}b^{\delta'}$, and $h'=c^{\gamma'}d^{\delta'}$;
- transmitting the commitment values $e_1'$, $g'$, $e_2'$, $h'$ from the prover to the verifier;
- transmitting, from said verifier, said pair of random values $S_1$ and $S_2$ to the prover in response to receipt of the commitment values;
- receiving, at the prover, the transmitted random values $S_1$ and $S_2$;
- determining, at said prover, whether a relation $S''=G^{S_1}H^{S_2}$ is established;
- if said relation is established, generating at said prover, a set of response values $R_1=S_1\alpha+\alpha'$, $R_2=S_1\beta+\beta'$, $R_3=S_2\gamma+\gamma'$, and $R_4=S_2\delta+\delta'$;
- transmitting, from the prover, the response values $R_1$, $R_2$, $R_3$ and $R_4$ to the verifier;
- calculating, at the verifier, $e_1^{S_1}e_1'=a^{R_1}b^{R_2}$, $g^{S_1}g_1'=c^{R_1}d^{R_2}$, $e_2^{S_2}e_2'=a^{R_3}b^{R_4}$, and $h^{S_2}h'=c^{R_3}d^{R_4}$ to produce said relations; and
- determining, at said verifier, whether all of said relations are established.

13. The method of claim 8, wherein the showing, receiving, and determining by said verifier whether said prover is capable of establishing said relations by using the public key and the received e, g and h each comprises:
- generating, at said prover, a set of random values;
- generating, at said prover, a set of commitment values using said set of random values;

calculating, at said prover, a pair of Hash values of said public key and said commitment values to produce auto-challenging values;

calculating, at said prover, a set of response values by using the auto-challenging values, the public key and said set of random values;

transmitting, from the prover, the set of commitment values and the set of response values to the verifier;

receiving, at the verifier, the set of commitment values and the set of response values;

calculating, at the verifier, a pair of Hash values of said public key and the received commitment values; and determining, at the verifier, whether said prover is capable of establishing said relations based on the public key, the calculated Hash values, the received response values, and said received commitment values.

14. The method of claim 8, wherein the showing, receiving, and determining by said verifier whether said prover is capable of establishing said relations by using the public key and the received e, g and h each comprises:

generating, at said prover, a set of random values $\alpha'$, $\beta'$, $\gamma'$ and $\delta'$;

calculating, at said prover, a set of commitment values $e_1'=a^{\alpha'}b^{\beta'}$, $g'=c^{\alpha'}d^{\beta'}$, $e_2'=a^{\gamma'}b^{\delta'}$, and $h'=c^{\gamma'}d^{\delta'}$;

calculating, at the prover, an auto-challenging value $S_1=H(a, b, c, d, e, g, e_1', g')$ and an auto-challenging value $S_2=H(a, b, c, d, e, h, e_2', h')$;

calculating, at the prover, a set of response values $R_1=S_1\alpha+\alpha'$, $R_2=S_1\beta+\beta'$, $R_3=S_2\gamma+\gamma'$, and $R_4=S_2\beta+\beta'$;

transmitting, from the prover, the set of commitment values and the set of response values to the verifier;

receiving, at the verifier, the set of commitment values and the set of response values;

calculating, at said verifier, $S_1'=H(a, b, c, d, e, g, e_1', g')$ and $S_2'=H(a, b, c, d, e, h, e_2', h')$;

calculating, at said verifier, $e_1^{S_1}e_1'=a^{R_1}b^{R_2}$, $g^{S_1}g_1'=c^{R_1}d^{R_2}$, $e_2^{S_2}e_2'=a^{R_3}b^{R_4}$ and $h^{S_2}h'=c^{R_3}d^{R_4}$ to produce said relations; and determining, at said verifier, whether all of said relations are established.

15. A cryptographic communication system, comprising:

a computer-readable storage medium of a prover, the storage medium containing a prover's program executable by a processor to accomplish a method for identification of the prover to a verifier by using a plurality of elements a, b, c, d of a finite group as a public key accessible by both of said prover and said verifier and a parameter "x" as a private key accessible only by said prover, wherein "x" is equal to discrete logarithm of "b" to base "a", said method comprising:

generating random values $\beta$, $\gamma$ and $\delta$;

calculating $e=a^\alpha b^\beta$, $g=c^\alpha d^\beta$ and $h=c^\gamma d^\delta$, where $\alpha=\gamma+x(\delta-\beta)$;

transmitting e, g and h to said verifier;

showing to said verifier that relations $a^{\alpha''}b^{\beta''}=e$, $c^{\alpha''}d^{\beta''}=g$, $a^{\gamma''}b^{\delta''}=e$, and $c^{\gamma''}d^{\delta''}=h$ are established without transmitting $\alpha''$, $\beta''$, $\gamma''$ and $\delta''$; and a computer-readable storage medium of said verifier, the storage medium containing a verifier's program executable by a processor to accomplish a method for identification of said provider to said verifier, the method comprising:

receiving the transmitted e, g, and h at said verifier;

determining by said verifier whether said prover is capable of establishing said relations $a^{\alpha''}b^{\beta''}=e$, $c^{\alpha''}d^{\beta''}=g$, $a^{\gamma''}b^{\delta''}=e$, and $c^{\gamma''}d^{\delta''}=h$ without knowing a", b", g", d" (where $\alpha''$, $\beta''$, $\gamma''$ and $\delta''$ are random values) by using the public key and the received e, g and h; and determining whether there is a mismatch between g and h, whereby said prover establishes a proof that the parameter x is not equal to discrete logarithm of "d" to base "c" only if said verifier determines that said relations are established and detects said mismatch.

16. The cryptographic communication system of claim 15, wherein the showing to the verifier comprises:

generating a set of random values;

generating a set of commitment values using the set of random values;

transmitting the commitment values to said verifier, wherein the verifier is configured to generate a pair of random values in response to the commitment values and transmit said pair of random values to the prover for challenging the commitment values;

receiving the challenging random values; and generating a set of response values using said public key, said set of random values and the received challenging random values, transmitting the response values from the prover to the verifier, wherein the verifier is configured to receive the transmitted response values, and determine whether said prover is capable of establishing said relations based on the received response values, said received commitment values and said transmitted challenging values.

17. A cryptographic communication system comprising:

a store that stores a plurality of random values a, b, c, d of a finite group as a public key and a parameter "x" as a private key, wherein "x" is equal to a discrete logarithm of "b" to base "a";

a verifier connected to a communication channel, said verifier being accessible only to said public key; and a prover connected to said verifier via said communication channel, the prover being accessible to said public key and said private key for calculating random values $e=a^\alpha b^\beta$, $g=c^\alpha d^\beta$ and $h=c^\gamma d^\delta$ (where $\alpha=\gamma+x(\delta-\beta)$ and $\gamma$, $\delta$ and $\beta$ are random values), and calculating commitment values $e_1'=a^{\alpha'}b^{\beta'}$, $g'=c^{\alpha'}d^{\beta'}$, $e_2'=a^{\gamma'}b^{\delta'}$, $h'=c^{\gamma'}d^{\delta'}$ (where $\alpha'$, $\beta'$, $\gamma'$ and $\delta$ are random values), and transmitting the random values e, g, h, and the commitment values $e_1'$, $g'$, $e_2'$, $h'$ to the verifier, wherein said verifier is configured to respond to said random values e, g, h and said commitment values $e_1'$, $g'$, $e_2'$, $h'$ by transmitting to said prover a random value $S_1$ for challenging the commitment values $e_1'$ and $g'$ and a random value $S_2$ for challenging the commitment values $e_2'$ and $h'$, wherein said prover is configured to respond to the random values $S_1$ and $S_2$ by calculating response values $R_1=S_1\alpha+\alpha'$, $R_2=S_1\beta+\beta'$, $R_3=S_2\gamma+\gamma'$ $R_4=S_2\beta+\beta'$ and transmitting the response values $R_1$, $R_2$, $R_3$ and $R_4$ to the verifier, and wherein said verifier is configured to respond to the response values by calculating $e_1^{S_1}e_1'=a^{R_1}b^{R_2}$, $g^{S_1}g_1'=c^{R_1}d^{R_2}$, $e_2^{S_2}e_2' = a^{R_3}b^{R_4}$ and $h^{S_2}h' = c^{R_3}d^{R_4}$ to establish relations $a^{\alpha''}b^{\beta''} = e,$ $c^{\alpha''}d^{\beta''} = g,$ $a^{\gamma''}b^{\delta''} = e$ and $c^{\gamma''}d^{\delta''} = h$ without receiving $\alpha''$, $\beta''$, $\gamma''$, $\delta''$ from said prover (where $\alpha''$, $\beta''$, $\gamma''$ and $\delta''$ are random values).

18. A cryptographic communication system comprising:
a store that stores a plurality of random values a, b, c, d of a finite group as a public key and a parameter "x" as a private key, wherein "x" is equal to a discrete logarithm of "b" to base "a";
a verifier connected to a communication channel, said verifier being accessible only to said public key; and
a prover connected to said verifier via said communication channel, the prover being accessible to said public key and said private key for calculating random values $e = a^\alpha b^\beta$, $g = c^\alpha d^\beta$ and $h = c^\gamma d^\delta$ (where $\alpha = \gamma + x(\delta - \beta)$, and $\gamma$, $\delta$ and $\beta$ are random values), transmitting the calculated random values e, g, h and random values G and H to the verifier,
wherein said verifier is configured to respond to said random values G and H by transmitting a challenging value $S'' = G^{S_1} S^{S_2}$ to the prover (where $S_1$ and $S_2$ are random values),
wherein said prover is configured to respond to the challenging value $S''$ by transmitting commitment values $e_1' = a^{\alpha'}b^{\beta'}$, $g' = c^{\alpha'}d^{\beta'}$, $e_2' = a^{\gamma'}b^{\delta'}$, $h' = c^{\gamma'}d^{\delta'}$ (where $\alpha'$, $\beta'$, $\gamma'$ and $\delta'$ are random values) to the verifier,
wherein said verifier is configured to respond to said commitment values by transmitting said random values $S_1$ and $S_2$ to the prover,
wherein the prover is configured to respond to the random values $S_1$ and $S_2$ by calculating response values $R_1$, $R_2$, $R_3$ and $R_4$ if $S'' = G^{S_1}H^{S_2}$, $R_1 = S_1\alpha + \alpha',$ $R_2 = S_1\beta + \beta',$ $R_3 = S_2\gamma + \gamma'$ $R_4 = S_2\beta + \beta'$ and transmitting the response values $R_1$, $R_2$, $R_3$ and $R_4$ to the verifier, and
wherein said verifier is configured to respond to the response values by calculating $e_1^{S_1}e_1' = a^{R_1}b^{R_2},$ $g^{S_1}g_1' = c^{R_1}d^{R_2},$ $e_2^{S_2}e_2' = a^{R_3}b^{R_4}$ and $h^{S_2}h' = c^{R_3}d^{R_4}$ to establish relations $a^{\alpha''}b^{\beta''} = e,$ $c^{\alpha''}d^{\beta''} = g,$ $a^{\gamma''}b^{\gamma''} = e$ and $c^{\gamma''}d^{\delta''} = h$ without receiving $\alpha''$, $\beta''$, $\gamma''$, $\delta''$ from said prover (where $\alpha''$, $\beta''$, $\gamma''$ and $\delta''$ are random values).

19. A cryptographic communication system comprising:
a store that stores a plurality of random values a, b, c, d of a finite group as a public key and a parameter "x" as a private key, wherein "x" is equal to a discrete logarithm of "b" to base "a";
a verifier connected to a communication channel, said verifier being accessible only to said public key; and
a prover connected to said verifier via said communication channel, the prover being accessible to said public key and said private key for calculating random values $e = a^\alpha b^\beta$, $g = c^\alpha d^\beta$ and $h = c^\gamma d^{67}$ (where $\alpha = \gamma + x(\delta - \beta)$, and $\gamma$, $\delta$ and $\beta$ are random values), transmitting e, g and h to the verifier, calculating commitment values $e_1' = a^{\alpha'}b^{\beta'}$, $g' = c^{\alpha'}d^{\beta'}$, $e_2' = a^{\gamma'}b^{\delta'}$, $h' = c^{\gamma'}d^{\delta'}$ (where $\alpha'$, $\beta'$, $\gamma'$ and $\delta'$ are random values), Hash values $S_1 = H(a, b, c, d, e, g, e_1', g')$ and $S_2 = H(a, b, c, d, e, h, e_2', h')$ and response values $R_1 = S_1\alpha + \alpha',$ $R_2 = S_1\beta + \beta',$ $R_3 = S_2\gamma + \gamma'$ $R_4 = S_2\beta + \beta'$ and transmitting $e_1'$, $g'$, $e_2'$, $h'$, $S_1$, $S_2$, $R_1$, $R_2$, $R_3$ and $R_4$ to the verifier, and
wherein the verifier is configured to respond to $e_1'$, $g'$, $e_2'$, $h'$, $S_1$, $S_2$, $R_1$, $R_2$, $R_3$ and $R_4$ by calculating Hash values $S_1' = H(a, b, c, d, e, g, e_1', g')$ and $S_2' = H(a, b, c, d, e, h, e_2', h')$ and calculating $e_1^{S_1}e_1' = a^{R_1}b^{R_2},$ $g^{S_1}g_1' = c^{R_1}d^{R_2},$ $e_2^{S_2}e_2' = a^{R_3}b^{R_4}$ and $h^{S_2}h' = c^{R_3}d^{R_4}$ to establish relations $a^{\alpha''}b^{\beta''} = e,$ $c^{\alpha''}d^{\beta''} = g,$ $a^{\gamma''}b^{\delta''} = e,$ and $c^{\gamma''}d^{\delta''} = h$ without receiving $\alpha''$, $\beta''$, $\gamma''$, $\delta''$ from said prover (where $\alpha''$, $\beta''$, $\gamma''$ and $\delta''$ are random values).

20. A method of identifying a prover to a verifier connected to the prover via a communication channel, said method comprising:
storing a plurality of random values a, b, c, d of a finite group as a public key and a parameter "x" as a private key, wherein "x" is equal to a discrete logarithm of "b" to base "a", wherein said prover is accessible to said public key and said private key and said verifier is only accessible to said public key;
at said prover, calculating random values $e = a^\alpha b^\beta$, $g = c^\alpha d^\beta$ and $h = c^\gamma d^\delta$ (where $\alpha = \gamma + x(\delta - \beta)$ and where $\gamma$, $\delta$ and $\beta$ are random values) and calculating commitment values $e_1' = a^{\alpha'}b^{\beta'}$, $g' = c^{\alpha'}d^{\beta'}$, $e_2' = a^{\gamma'}b^{\delta'}$, $h' = c^{\gamma'}d^{\delta'}$ (where $\alpha'$, $\beta'$, $\delta'$ and $\delta'$ are random values) and transmitting the random values e, g, h and said commitment values $e_1'$, $g'$, $e_2'$, $h'$ to the verifier;

at said verifier, responding to the commitment values by transmitting to said prover a random value $S_1$ for challenging the commitment values $e_1'$ and $g'$ and a random value $S_2$ for challenging the commitment values $e_2'$ and $h'$;

at said prover, responding to the challenging values by calculating response values $R_1=S_1\alpha+\alpha'$, $R_2=S_1\beta+\beta'$, $R_3=S_2\gamma+\gamma'$, and $R_4=S_2\beta+\beta'$ and transmitting the response values $R_1$, $R_2$, $R_3$ and $R_4$ to the verifier; and at said verifier, responding to the response values by calculating $e_1^{S_1}e_1'=a^{R_1}b^{R_2}$, $g^{S_1}g_1'=c^{R_1}d^{R_2}$, $e_2^{S_2}e_2'=a^{R_3}b^{R_4}$, and $h^{S_2}h'=c^{R_3}d^{R_4}$ to produce said relations and determining whether all of said relations are established.

21. A method of identifying a prover to a verifier connected to the prover via a communication channel, said method comprising:

storing a plurality of random values a, b, c, d of a finite group as a public key and a parameter "x" as a private key, wherein "x" is equal to a discrete logarithm of "b" to base "a";

at said prover, calculating random values $e=a^\alpha b^\beta$, $g=c^\alpha d^\beta$ and $h=c^\gamma d^\delta$ (where $\alpha=\gamma+x(\delta-\beta)$, and $\gamma$, $\delta$ and $\beta$ are random values), and transmitting e, g, h and random values G and H to the verifier, at said verifier, responding to said random values e, g, h, G and H by transmitting a challenging value $S''=G^{S_1}H^{S_2}$ to the prover (where $S_1$ and $S_2$ are random values), at said prover, responding to the challenging value $S''$ by transmitting commitment values $e_1'=a^{\alpha'}b^{\beta'}$, $g'=c^{\alpha'}d^{\beta'}$, $e_2'=a^{\gamma'}b^{\delta'}$, $h'=c^{\gamma'}d^{\delta'}$ (where $\alpha'$, $\beta'$, $\gamma'$ and $\delta$ are random values) to the verifier, at said verifier, responding to said commitment values by transmitting said random values $S_1$ and $S_2$ to the prover, at said prover, responding to the random values $S_1$ and $S_2$ by calculating response values $R_1$, $R_2$, $R_3$ and $R_4$ if $S''=G^{S_1}H^{S_2}$, $$R_1=S_1\alpha+\alpha',$$

$$R_2=S_1\beta+\beta,$$

$$R_3=S_2\gamma+\gamma'$$

$$R_4=S_2\beta+\beta', \text{ and}$$

transmitting the response values $R_1$, $R_2$, $R_3$ and $R_4$ to the verifier, and at said verifier, responding to the response values by calculating $$e_1^{S_1}e_1'=a^{R_1}b^{R_2},$$

$$g^{S_1}g_1'=c^{R_1}d^{R_2},$$

$$e_2^{S_2}e_2'=a^{R_3}b^{R_4}, \text{ and}$$

$$h^{S_2}h'=c^{R_3}d^{R_4}$$

to establish relations $$a^{\alpha''}b^{\beta''}=e,$$

$$c^{\alpha''}d^{\beta''}=g,$$

$$a^{\gamma''}b^{\delta''}=e, \text{ and}$$

$$c^{\gamma''}d^{\delta''}=h$$

without receiving $\alpha''$, $\beta''$, $\gamma''$, $\delta''$ from said prover (where $\alpha''$, $\beta''$, $\gamma''$ and $\delta''$ are random values).

22. A method of identifying a prover to a verifier connected to the prover via a communication channel, said method comprising:

storing a plurality of random values a, b, c, d of a finite group as a public key and a parameter "x" as a private key, wherein "x" is equal to a discrete logarithm of "b" to base "a";

at said prover, calculating random values $e=a^\alpha b^\beta$, $g=c^\alpha d^\beta$ and $h=c^\gamma d^\delta$ (where $\alpha=\gamma+x(\delta-\beta)$, and $\gamma$, $\delta$ and $\beta$ are random values), transmitting e, g and h to the verifier, calculating commitment values $e_1'=a^{\alpha'}b^{\beta'}$, $g'=c^{\alpha'}d^{\beta'}$, $e_2'=a^{\gamma'}b^{\delta'}$, $h'=c^{\gamma'}d^{\delta'}$ (where $\alpha$, $\beta$, $\gamma'$ and $\delta'$ are random values), Hash values $S_1=H(a, b, c, d, e, g, e_1', g')$ and $S_2=H(a, b, c, d, e, h, e_2', h')$ and response values $$R_1=S_1\alpha+\alpha',$$

$$R_2=S_1\beta+\beta',$$

$$R_3=S_2\gamma+\gamma'$$

$$R_4=S_2\beta+\beta' \text{ and}$$

transmitting $e_1'$, $g'$, $e_2'$, $h'$, $S_1$, $S_2$, $R_1$, $R_2$, $R_3$ and $R_4$ to the verifier, and at said verifier, responding to $e_1'$, $g'$, $e_2'$, $h'$, $S_1$, $S_2$, $R_1$, $R_2$, $R_3$ and $R_4$, by calculating Hash values $S'_1=H(a, b, c, d, e, g, e_1', g')$ and $S'_2=H(a, b, c, d, e, h, e_2', h')$ and calculating $$e_1^{S_1}e_1'=a^{R_1}b^{R_2},$$

$$g^{S_1}g_1'=c^{R_1}d^{R_2},$$

$$e_2^{S_2}e_2'=a^{R_3}b^{R_4} \text{ and}$$

$$h^{S_2}h'=c^{R_3}d^{R_4}$$

to establish relations $$a^{\alpha''}b^{\beta''}=e,$$

$$c^{\alpha''}d^{\beta''}=g,$$

$$a^{\gamma''}b^{\delta''}=e, \text{ and}$$

$$c^{\gamma''}d^{\delta''}=h$$

without receiving $\alpha''$, $\beta''$, $\gamma''$, $\delta''$ from said prover (where $\alpha''$, $\beta''$, $\gamma''$ and $\delta''$ are random values).

* * * * *